(No Model.)
W. A. H. SCHÖNEFELD.
REFRIGERATOR.
No. 564,719.   Patented July 28, 1896.
Fig: 1.
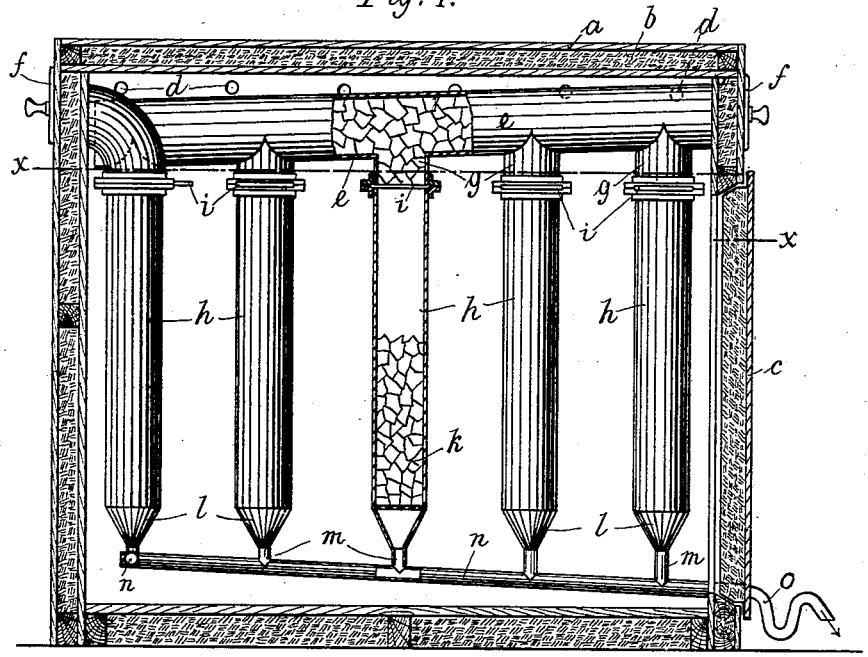
Fig: 2.
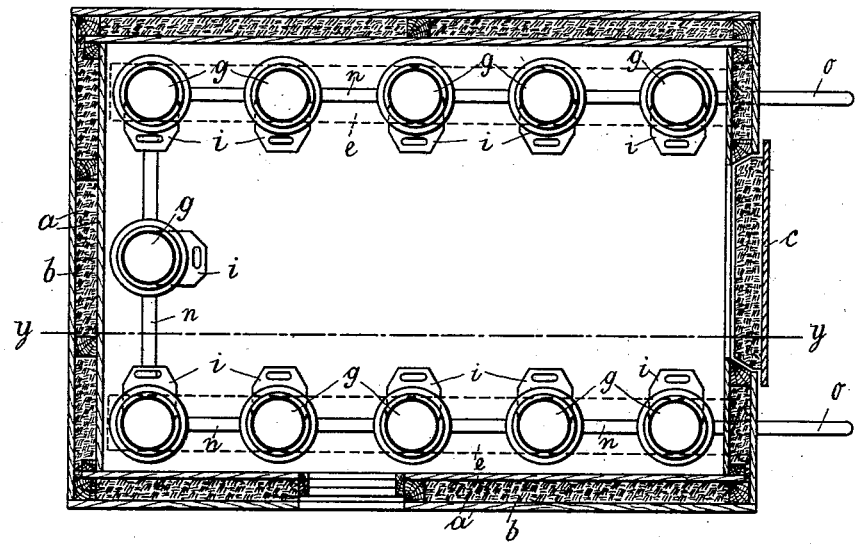
Witnesses:
Thomas M. Smith.
Richard C. Maxwell.
Inventor:
Wilhelm A. H. Schönefeld,
By J. Walter Douglass.
Attorney.
THE NORRIS PETERS CO., PHOTO-LITHO., WASHINGTON, D. C.

UNITED STATES PATENT OFFICE.

WILHELM ALBERT HERRMANN SCHÖNEFELD, OF WEISSENSEE, GERMANY.

REFRIGERATOR.

SPECIFICATION forming part of Letters Patent No. 564,719, dated July 28, 1896.

Application filed March 17, 1896. Serial No. 583,526. (No model.)

*To all whom it may concern:*

Be it known that I, WILHELM ALBERT HERRMANN SCHÖNEFELD, builder, a subject of the Emperor of Germany, and a resident of Weissensee, near Berlin, in the Empire of Germany, have invented a new and useful Improved Means for Cooling the Air in Cooling-Chambers and the Like, of which the following is a full, clear, and exact description.

This invention relates to a means for cooling the air in closed chambers or refrigerators containing victuals or beverages to be cooled or preserved. The arrangement is such that the air in the chamber cannot come in direct contact with the ice or other cooling medium, as experience has shown that air charged with moisture tends to spoil the articles, notwithstanding the low temperature in the chamber.

According to this invention, tubular bodies for receiving a mixture of salt and ice, or other cooling agent, are so arranged in the cooling-chamber that their upper ends communicate with a feeding-receptacle common to all and their lower ends with outlet-pipes, likewise common to all, for carrying off the drip-water from the ice. The feeding-receptacle is preferably arranged so that the ice can be put into the receiving-tubes without opening the cooling-chamber proper. The outlet-pipes are also preferably provided with air-seals for preventing any air finding access to the chamber. It is also found advisable to furnish the receiving-pipes with slides or the like, in order that one or more of the series may be closed, as desired, according to the cooling-surface required.

In order that my invention may be thoroughly understood, I have illustrated on the accompanying drawings, by way of example, the arrangement of the device in an oblong cooling-chamber or refrigerator.

Figure 1 is a vertical section on line $y\ y$ of Fig. 2, and Fig. 2 a horizontal section on line $x\ x$ of Fig. 1.

The cooling-chamber or refrigerator is preferably made with double walls $a\ a$, between which is placed a suitable insulating material $b$, such as ashes, ground slag, or the like.

The chamber is closed on all sides and is provided with a tightly-closing door $c$. If necessary, easily-closable orifices $d$ may be made near the top of the chamber for admitting fresh air. It will, however, in most cases be found that the air in the chamber is sufficiently renewed by merely opening the door $c$. Near the top of the chamber are provided tubular bodies or receptacles $e$, which preferably incline somewhat toward their closed ends, the other ends being made accessible through tightly-closing doors or covers $f$ in the walls of the chamber. The receptacles $e$ are provided with connections $g$ for securing same to a series of vertically-arranged tubes $h$, whose upper ends have corresponding flanges for permitting of their ready attachment to the receptacles $e$. The ice, or mixture of salt and ice, put through the doors $f$ into the receptacles $e$ thus falls into the tubes $h$. The latter are provided near their flanges, or at any other suitable part, with slides $i$, by means of which one or more of the tubes $h$ can be closed as desired—*i. e.*, so that the ice cannot fall into same.

The lower ends of tubes $h$ have gratings $k$ for supporting the ice. Such ends also taper, as shown at $l$, Fig. 1, and finally communicate with the pipe $n$, common to all, for carrying off the water dripping from the ice. Traps $o$ are arranged in the pipes $n$ for preventing the outer and warmer air finding its way into same, and this without interfering with the flow of the water from the melted ice.

In order that any sediment from the melted ice may be readily removed from the pipes $h$, a sediment-catcher may be suitably arranged in connection with such pipes, and thus no dirt or the like can pass into and stop the pipes $n$.

It will be evident that the number, shape, and size of the pipes $h$ will differ, according to the size and shape of the cooling-chamber and the particular purpose for which the latter is intended. It is, however, preferable to arrange same along the walls of the chamber and to connect the drip-water pipes $n$.

Any suitable material which does not readily corrode may be used for the feeding-pipes $h$. Their arrangement is preferably such that they offer the largest possible superficial area or cooling-surface, and thus better fulfil their functions of cooling the air in the chamber.

It will also be evident that the pipes $h$ may be provided with flanges or the like for supporting shelves on which the articles to be cooled or preserved may be placed.

Having now particularly described and ascertained the nature of this invention, I declare that what I claim, and wish to secure by Letters Patent, is—

In a refrigerator or similar apparatus, a series of vertical receiving-tubes arranged within the walls of the refrigerator, a grating formed near the lower end and within each tube, a series of receptacles arranged at substantially right angles to the upper ends of the tubes and in communication therewith, a slide adapted to open or close communication between a tube and a receptacle, and drip-pipes connected with each tube below the grating and discharging outside the walls of the refrigerator, said receptacles extending to and through the wall of the refrigerator and adapted to be filled with the refrigerant from outside the refrigerator, substantially as and for the purposes described.

In witness whereof I have hereunto signed my name in the presence of two subscribing witnesses.

WILHELM ALBERT HERRMANN SCHÖNEFELD.

Witnesses:
    F. KOLLM,
    W. HAUPT.